United States Patent [19]
Alperovich et al.

[11] Patent Number: 5,873,034
[45] Date of Patent: Feb. 16, 1999

[54] DEFAULT LONG DISTANCE CARRIER SELECTION WITHIN A VISITED PUBLIC LAND MOBILE NETWORK

[75] Inventors: Vladimir Alperovich, Dallas; Eric Valentine, Plano, both of Tex.

[73] Assignee: Ericsson Inc., Research Triangle Park, N.C.

[21] Appl. No.: 688,836

[22] Filed: Jul. 31, 1996

[51] Int. Cl.$^6$ .................................................. H04M 11/00
[52] U.S. Cl. .................... 455/432; 455/433; 455/445; 455/406; 455/409
[58] Field of Search .................................. 455/406, 405, 455/432, 433

[56] References Cited

U.S. PATENT DOCUMENTS

| | | |
|---|---|---|
| 4,565,903 | 1/1986 | Riley . |
| 5,497,412 | 3/1996 | Lannen et al. . |
| 5,526,400 | 6/1996 | Nguyen .................................... 455/445 |
| 5,537,467 | 7/1996 | Cheng et al. . |
| 5,546,452 | 8/1996 | Andrews et al. ........................ 379/219 |
| 5,579,379 | 11/1996 | D'Amico et al. ........................ 455/406 |
| 5,748,717 | 5/1998 | Chan et al. .............................. 455/406 |

FOREIGN PATENT DOCUMENTS

96/09714  3/1996  WIPO .

Primary Examiner—David R. Hudspeth
Assistant Examiner—Daniel Abebe
Attorney, Agent, or Firm—Jenkens & Gilchrist, P.C.

[57] ABSTRACT

Whenever a roaming mobile subscriber's preferred long distance carrier is not ascertainable by a visited Public Land Mobile Network (PLMN), instead of utilizing a default long distance carrier selected by the visited PLMN, the serving mobile switching center (MSC) analyzes the received International Mobile Subscriber Identity (IMSI) number to determine the home network provider or PLMN associated with the roaming mobile subscriber. Using the determined home network provider data, the serving MSC retrieves the correlated home PLMN preferred long distance carrier data from its associated register. A long distance carrier specified by the retrieved data is then utilized by the serving MSC to serve all long distance calls originated from and forwarded by the roaming mobile station.

21 Claims, 5 Drawing Sheets

FIG.3

| MOBIL TEL | CARRIER ID | BILLING ID |
|---|---|---|
| | CARRIER ID | BILLING ID |
| | CARRIER ID | BILLING ID |
| | ∘ ∘ ∘ | |
| FRANCE TEL | CARRIER ID | BILLING ID |
| | CARRIER ID | BILLING ID |
| | CARRIER ID | BILLING ID |
| | ∘ ∘ ∘ | |

DEFAULT LONG DISTANCE CARRIER SELECTION WITHIN A VISITED PUBLIC LAND MOBILE NETWORK

BACKGROUND OF THE INVENTION

1. Technical Field of the Invention

The present invention relates to a mobile telecommunications network and, in particular, to the selection of a default long distance carrier within a visited Public Land Mobile Network (PLMN).

2. Description of Related Art

With the development of Public Land Mobile Network (PLMN) telecommunications systems, mobile subscribers are able to freely travel within a particular country and utilize their mobile service. Even if the mobile subscriber is roaming within a visited PLMN, the home PLMN associated with the roaming mobile subscriber keeps track of the current location of the mobile subscriber and accordingly makes the necessary arrangements and communications to enable the mobile subscriber to receive and originate calls via another PLMN.

Whenever a particular mobile station travels into a visited PLMN, a mobile switching center (MSC) detecting the presence of the roaming mobile station performs a location update procedure with a home location register (HLR) associated with the roaming mobile station. By performing a location update, the serving MSC informs the HLR of the current location of the mobile station and also retrieves requisite subscriber data associated with the roaming mobile station from the HLR. The retrieved subscriber data are then stored within a visitor location register (VLR) attached to the serving MSC and subsequently utilized for providing mobile service to the roaming mobile station. Such retrieved data include the Mobile Subscriber Integrated Service Digital Network (MSISDN) number, feature application data, and Preferred Inter-Lata Carrier (PIC, or more commonly known as a long distance carrier) data. Utilizing the PIC data, even if the mobile station is roaming within a visited PLMN, if the long distance carrier specified by the received PIC data is providing service within the visited PLMN area, all long distance calls originated from or forwarded by the mobile stations are still routed through the specified long distance carrier. For example, if a particular mobile subscriber has designated American Telegraph & Telephone (AT&T) as his long distance carrier, even if the mobile subscriber is roaming outside of his home PLMN, and assuming AT&T is available, all long distance calls are still provided by AT&T within the visited PLMN.

However, in the event that PIC data are not provided to the visited MSC, or the long distance carrier specified by the retrieved PIC data does not provide long distance service within that visited PLMN area, conventionally, the visited MSC has no option but to choose one of the long distance carriers that does provide service within that particular PLMN area as a default provider. However, the arrangements made between the visited PLMN and the default long distance carrier might not always be the most favorable to the roaming mobile subscriber or his home PLMN.

Accordingly, there is a need for a mechanism to enable a home PLMN to specify a default long distance carrier to be utilized within a visited PLMN in case the long distance carrier selected by an associated mobile subscriber roaming within the visited PLMN is not available.

SUMMARY OF THE INVENTION

The present invention discloses a method and apparatus for selecting a default long distance carrier for a mobile subscriber roaming within a visited Public Land Mobile Network (PLMN). The serving MSC receives an identification number associated with the roaming mobile station. By analyzing parts of the received identification number, the serving MSC determines the home network operator identity associated with that particular mobile station. By indexing a memory unit attached to the serving MSC using the determined home network operator identity, the serving MSC retrieves the correlated default long distance carrier data. Thereinafter, all long distance calls involving the mobile station are provided by the long distance carrier specified by the retrieved default long distance carrier data.

In one embodiment, the identification number includes an International Mobile Subscriber Identity (IMSI) number associated with the mobile station.

In another embodiment, the identification number includes a Mobile Subscriber Integrated Service Digital Network (MSISDN) number associated with the mobile station.

BRIEF DESCRIPTION OF THE DRAWINGS

A more complete understanding of the method and apparatus of the present invention may be had by reference to the following detailed description when taken in conjunction with the accompanying drawings wherein:

FIG. 3 is an exemplary data structure for storing home PLMN specific default long distance carrier data;

DETAILED DESCRIPTION OF THE DRAWINGS

Figure 1:
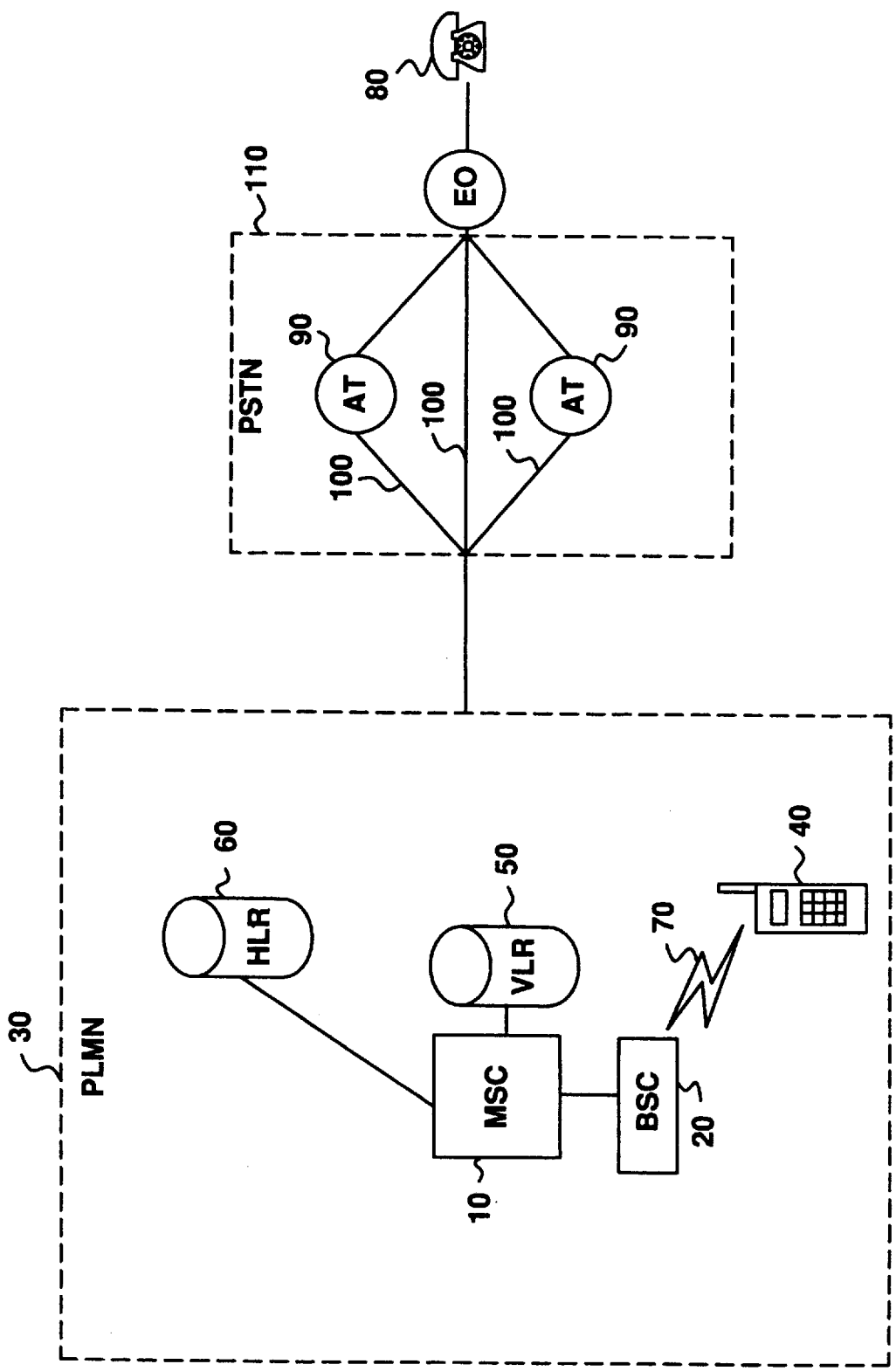
FIG. 1 is a block diagram of a telecommunications system providing mobile service to a mobile station.

FIG. 1 is a block diagram of a communications system, including a mobile switching center (MSC) 10 and a base station controller (BSC) 20 within a Public Land Mobile Network (PLMN) 30, providing mobile service to a mobile station 40. Whenever the mobile station 40 travels into a particular MSC coverage area, a visitor location register (VLR) 50 associated with the serving MSC 10 copies into its memory the relevant subscriber information from the home location register (HLR) 60 associated with that particular mobile subscriber. Such relevant subscriber information includes Mobile Subscriber Integrated Service Digital Network (MSISDN) number, subscriber application feature data, and Preferred Inter-Lata Carrier (PIC) data. Thereinafter, whenever the mobile station 40 originates an outgoing call, the radio signal 70 requesting an outgoing call setup is received by the BSC 20 connected to the serving MSC 10. The received request is then forwarded to the serving MSC 10, which in turn, processes the call setup request with the help of the subscriber information stored in the VLR 60. If the outgoing call connection is towards a wireline terminal 80, the call setup signal, such as an Initial Address Message (IAM) signal, is then transmitted from the serving MSC 10 to the connected Public Switched Telephone Network (PSTN) 90 to establish the call connection.

In case the outgoing call connection constitutes a long distance call, for example, to a wireline terminal 80 associated with a different Local Access Transport Area (LATA, the geographic boundaries within which Bell operating Companies, for example, are permitted to offer long distance traffic), there are a number of different alternatives for establishing the long distance call connection. The resulting call connection depends on which routes 100 and access tandems (ATs) 90 within the connected Public Switched Telephone Network (PSTN) 110 are currently available to process this particular call. Moreover, it also depends on which long distance carrier is selected by the mobile subscriber to provide the long distance connection between the mobile station 40 and the wireline terminal 80. Depending on the selected long distance carrier, different call connection routes 100 and long distance rates are utilized.

Usually, each PLMN 30 has a number of long distance carriers providing service to its mobile subscribers. Each mobile subscriber may have his preference for a particular long distance carrier because of its service, coverage area, or billing rates. Accordingly, each mobile subscriber can subscribe to any one particular long distance carrier and receive the corresponding long distance service. Thereinafter, all long distance calls originated from or forwarded by the mobile station 40 within the home PLMN 30a are served by the selected long distance carrier.

Figure 2:
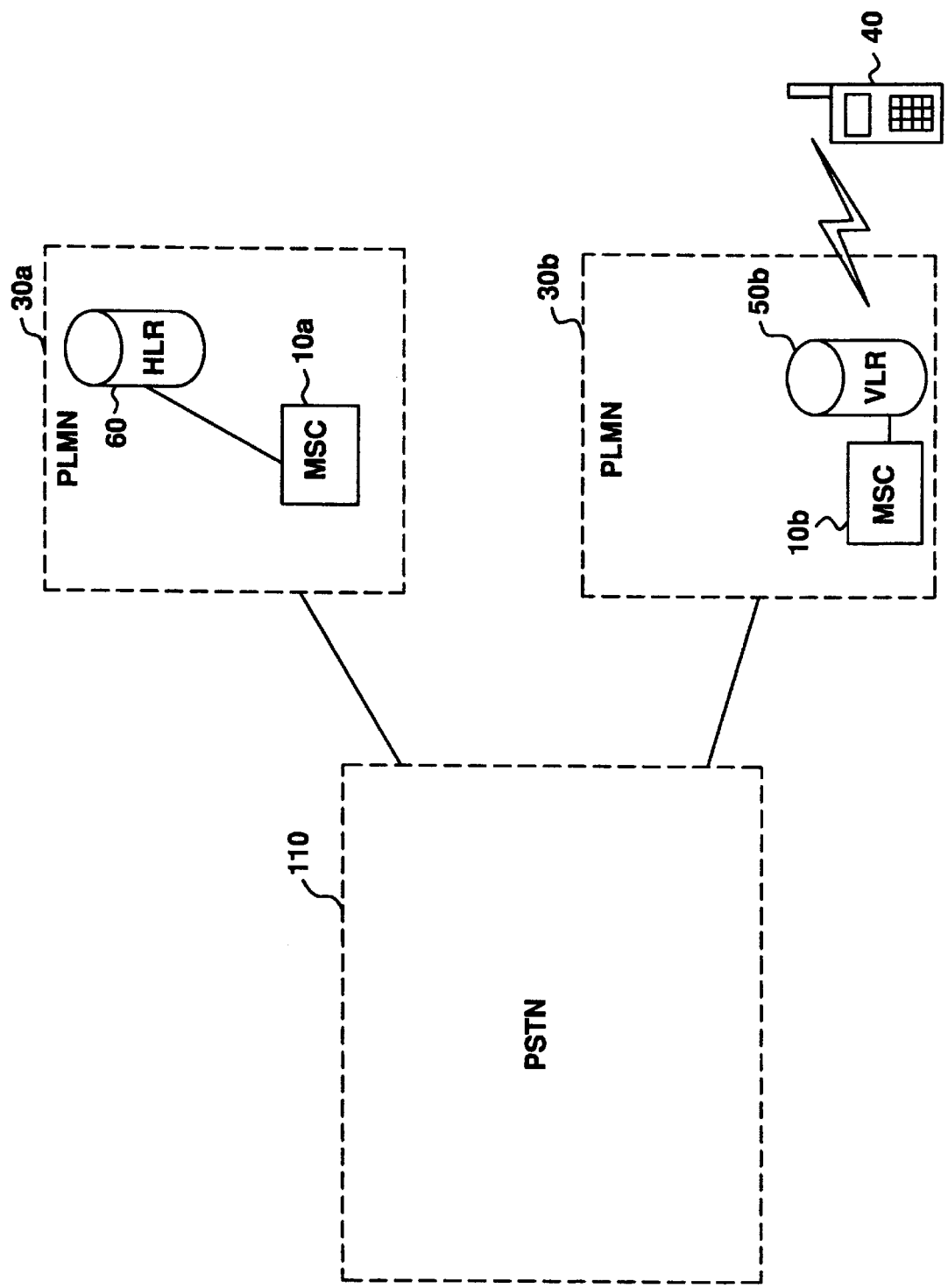
FIG. 2 is a block diagram of a telecommunications system providing mobile service to a mobile station roaming within a visited Public Land Mobile Network (PLMN)

Reference is now made to FIG. 2 illustrating a block diagram of a communications system, including a PSTN 110 and a visited PLMN 30b, providing mobile service to a mobile station 40 roaming within the visited PLMN 30b. As long as the mobile station 40 stays within the home PLMN 30a and is being served by one of the MSCs 10a connected to the home PLMN 30a, the subscriber designated long distance carrier is always used. On the other hand, if the mobile station 40 roams into a visited PLMN 30b, utilizing the same long distance carrier is not always possible. As described previously, whenever the mobile station 40 travels into a new MSC coverage area, the serving MSC performs a mobile station location update with the HLR 60 associated with the home PLMN 30a. The HLR 60, in turn, transmits relevant subscriber information to the serving MSC 10b. Upon receiving the subscriber information from the HLR 60, the serving MSC 10b stores the information to the associated VLR 50b. One of the subscriber information communicated from the HLR 60 to the VLR 50b is the PIC data. The PIC data indicates which long distance carrier should be utilized by the serving MSC to provide long distance service to the roaming mobile subscriber 40. Sometimes, due to incompatibility or mis-communications between the home PLMN 30a and the visited PLMN 30b, the PIC data are not always communicated properly between the HLR 60 and the serving MSC 10b. As a result, the serving MSC 10b has no way of determining which long distance carrier is preferred by the roaming mobile station 40. Furthermore, even if the subscriber designated PIC data are properly received by the serving MSC 10b, there are situations where the specified long distance carrier does not provide service within the visited PLMN area. Similarly, the serving MSC 10b has no way of providing long distance service through the specified long distance carrier.

In those instances, the serving MSC 10b is forced to select a default provider for the roaming mobile station. However, the agreements and terms made between the visited PLMN and the default long distance carrier might not always be the best for the roaming mobile subscriber or his home PLMN. As an illustration, the home PLMN 30a might already have an agreement with a particular long distance carrier providing long distance service within the visited PLMN area. As a result, it would be more beneficial for the roaming mobile station 40 to utilize that particular long distance carrier rather than to utilize a default long distance carrier arbitrary selected by the visited PLMN 30b.

Accordingly, there is a need for a mechanism to enable the home PLMN 30a to specify a default long distance carrier to be utilized within the visited PLMN 30b in case the long distance carrier selected by the mobile subscriber 40 roaming within the visited PLMN is not available.

FIG. 3 is an exemplary data structure for storing default long distance carrier data associated with a particular home network operator. Associated with each serving MSC is a register storing PLMN specific long distance carrier data formatted in accordance with the data structure 120. The first column of the data structure 120 represents the identity of the network operators or PLMNs whose mobile stations may roam into this particular PLMN area. Associated with each network operator are preferred long distance carrier data provided by each network operator. For example, home network operator data 130a representing MOBIL TEL are stored in the register correlated with its preferred long distance carrier identification numbers 140a–140c. The long distance carrier identification numbers represent the long distance carriers identified by MOBIL TEL as its preferred default carriers for its mobile subscribers roaming within this particular PLMN. As a result, whenever a mobile station associated with MOBIL TEL roams into the visited PLMN, and either the HLR associated with the roaming mobile station fails to provide the PIC data or the specified long distance carrier does not provide service within the visited PLMN, the serving MSC retrieves the correlated preferred long distance carrier data 140a–140c from the associated register. Since the long distance carriers identified by the retrieved long distance carrier data are already determined to be capable of providing long distance service within this particular PLMN area, the serving MSC selects a particular carrier with the highest priority from the table. For example, the carrier id 140a stored in the first entry for MOBIL TEL is selected. A determination is then made by the serving MSC to ascertain whether the carrier specified by the carrier id 140a is currently able to provide long distance service for this particular roaming mobile subscriber. If the selected carrier is not able to service this particular call, for example, because of trunk lines congestion or system failure, the next carrier id 140b is retrieved from the register. A similar determination is then made for the newly retrieved long distance carrier until an available carrier is found.

In case the mobile station roaming within this visited PLMN is from another country, such as France, after selecting an appropriate long distance carrier for providing long distance service to the roaming mobile station within this particular visited PLMN, the serving MSC further retrieves a corresponding billing account number from the register. Within a call setup signal, such as an Integrated Service Digital Network User Part (ISUP) based signal, a parameter must specify the directory number to be billed. If a mobile subscriber is from another country, his assigned directory number or MSISDN number may not be recognized by the U.S. PSTN and long distance carriers. Consequently, the selected long distance carrier providing the service would not be able to identity and bill a particular account for its service. Accordingly, in accordance with the teachings of the present invention, the home PLMN subscribes a billing account with each preferred long distance carrier providing service within a particular visited PLMN. The subscribed billing account number representing the home PLMN is then further stored at the register within each visited MSC. As an illustration, in case of France Telecom 130b, the most preferred U.S. long distance carrier within this particular visited PLMN is the carrier identified by the carrier identification data 140d. Furthermore, in order to enable the selected carrier to properly bill France Telecom, the register further stores a billing id 150 to be used by the serving MSC during call setup. Upon receiving the bill from the selected carrier, France Telecom, in turn, will charge the roaming mobile subscriber accordingly.

Figure 4:
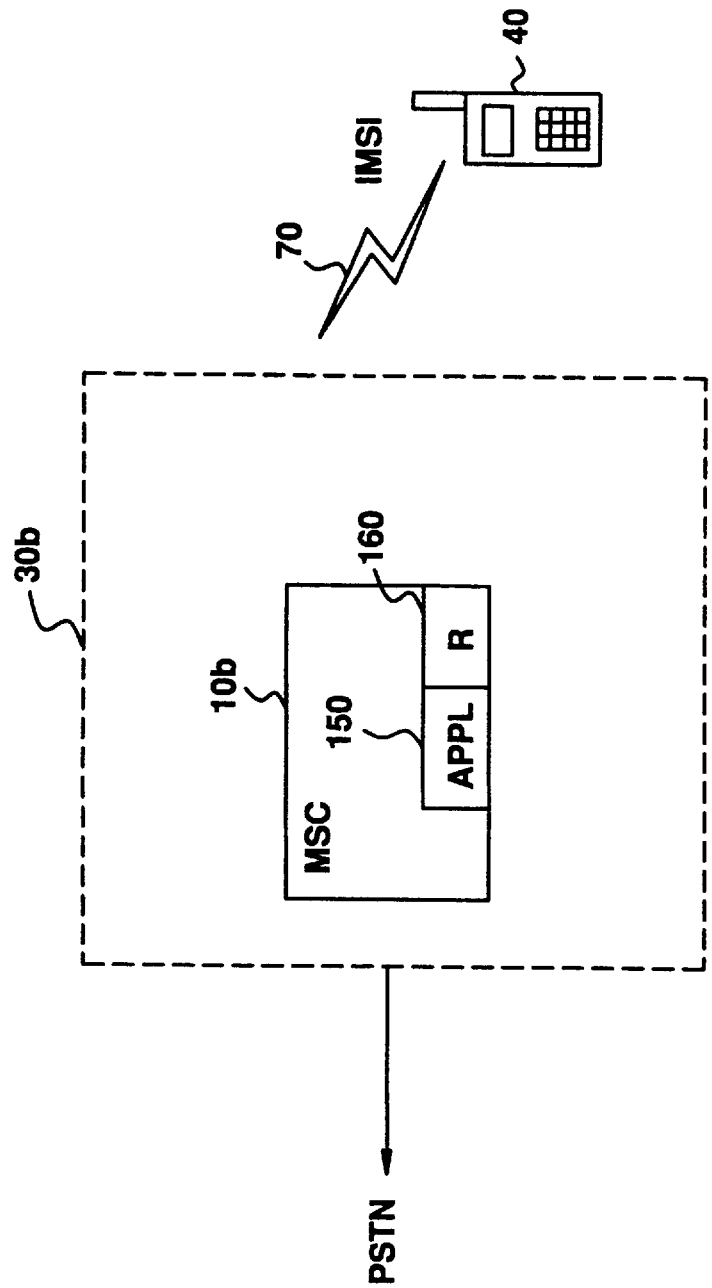
FIG. 4 is a block diagram of a PLMN associated with a serving mobile switching center (MSC) for determining a home PLMN specific long distance carrier in accordance with the teachings of the present invention.

FIG. 4 is a block diagram of the visited PLMN 30b associated with the serving mobile switching center (MSC) 10b determining a home PLMN specific long distance carrier for the mobile station 40 roaming within the visited PLMN 30b. Whenever the mobile station 40 travels into a new PLMN, the mobile station 40 transmits an identification number, such as an International Mobile Subscriber Identity (IMSI) number, to register with the serving MSC 10b. As described above, if the serving MSC 10b is unable to determine the identity of the subscriber preferred long distance carrier, or the indicated preferred long distance carrier does not provide service within the visited PLMN area, instead of arbitrary selecting a default carrier for the roaming mobile station, the serving MSC attempts to determine which long distance carrier has been designated by the home PLMN or network provider for this particular mobile station.

The received IMSI number is comprised of:

IMSI=MCC+MNC+MSIN where

MCC=Mobile Country Code (three digits)
MNC=Mobile Network Code (two digits)
MSIN=Mobile Subscriber Identification Number (max ten digits).

By analyzing parts of MCC and MNC, an application module 150 associated with the serving MSC 10b is able to determine which country and which network provider is associated with the roaming mobile station 40. In a similar manner, the application module 150 can instead analyze the assigned MSISDN number to also determine the home network provider or PLMN associated with the mobile station.

After making such a determination, the application module 150 indexes the register (R) 160 storing the home PLMN preferred long distance carrier data using the determined home network provider data. As illustrated in FIG. 3, the corresponding long distance carriers preferred by the home PLMN or network provider are then retrieved and utilized by the serving MSC 10b. Furthermore, if the identification number, such as MSISDN number, associated with the mobile station 40 is not recognizable within the existing telecommunications network, the application module 150 further retrieves the assigned billing account number from the register 160. Thereinafter, long distance calls originated from or forwarded by the mobile station 40 are routed by the selected long distance carrier.

Figure 5:
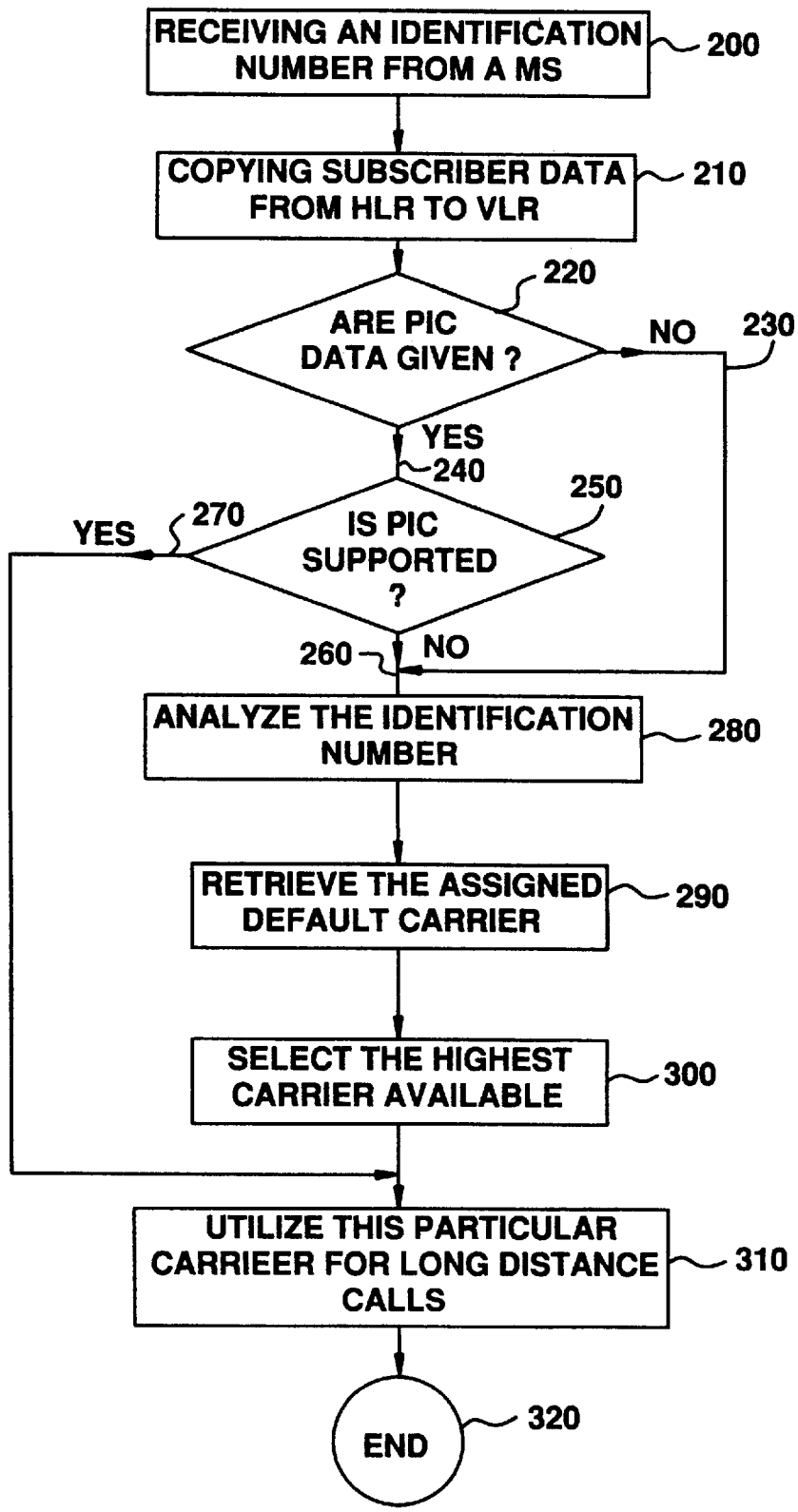
FIG. 5 is a flowchart illustrating a process for determining a home PLMN specific long distance carrier for a roaming mobile station.

FIG. 5 is a flowchart illustrating a process for determining a home PLMN specific long distance carrier for a roaming mobile station. The serving MSC receives an identification number, such as the assigned IMSI number, from the mobile station roaming into the MSC coverage area at step 200. The serving MSC attempts to inform the HLR associated with the roaming mobile station by transmitting a location update signal, such as a Mobile Application Part (MAP) based SS7 signal, using the received IMSI number as the destination address. If the location update has been successfully performed by the HLR associated with the roaming mobile station, the serving MSC, in return, receives subscriber data associated with the mobile station at step 210. Such data include a MSISDN number, subscriber application feature data, and possibly PIC data. Accordingly, a determination is then made to ascertain whether the return signal from the HLR contains the PIC data representing the subscriber preferred long distance carrier at step 220. If the PIC data are included (YES decision link 240), a next determination is then made to ascertain whether the particular long distance carrier specified by the received PIC data even provides service within the visited PLMN area at step 250. If such a carrier is available (YES decision link 270), all long distances call originated from and forwarded by the mobile station are served by the selected long distance carrier at step 310.

Referring back to step 220, if PIC data are not included in the return signal (NO decision link 230), or the long distance carrier specified by the included PIC data does not provide service within the visited PLMN area (No decision link 260), the application module within the serving MSC analyzes the received IMSI number representing the roaming mobile station. By analyzing parts of the received IMSI number, the application module determines the identity of the home network provider or PLMN associated with the roaming mobile station at step 280. After such a determination, the application module retrieves the home network provider preferred long distance carrier(s) from the attached register at step 290. If there is more than one long distance carrier specified by the home network provider, the application module selects a carrier with the highest priority that is currently available to provide long distance service to the mobile station at step 300. If the register further stores a billing account number for the selected long distance carrier, the serving MSC utilizes the assigned billing account number in the actual call setup signal. Accordingly, all subsequent outgoing calls originated from and forwarded by the mobile station are served by the selected long distance carrier using the assigned billing account number.

As a result, each home PLMN or network provider is able to make roaming agreements with a particular long distance carrier within each visited PLMN to provide the best service and most favorable rates to its roaming mobile subscribers.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for selecting a long distance carrier for a roaming mobile station from stored home network operator designated default long distance carrier information, said method comprising the steps of:

receiving an identification number associated with a roaming mobile station at a visited mobile switching center (MSC) currently serving said roaming mobile station;

analyzing said received identification number to determine a home network operator associated with said roaming mobile station by said visited MSC;

retrieving by said visited MSC from the stored home network operator designated default long distance carrier information data indicating a default long distance carrier designated by said determined home network operator; and selecting said default long distance carrier indicated by said data for a long distance call involving said roaming mobile station.

2. The method of claim 1 wherein said identification number comprises an International Mobile Subscriber Identity (IMSI) number associated with said roaming mobile station.

3. The method of claim 2 wherein said IMSI is further comprised of:
   a mobile country code (MCC);
   a mobile network code (MNC);
   a mobile subscriber identification number (MSIN); and
   wherein said step of determining said home network operator further comprises the step of analyzing any part of said MCC and MNC.

4. The method of claim 1 wherein said identification number comprises a Mobile Subscriber Integrated Service Digital Network (MSISDN) number associated with said roaming mobile station.

5. The method of claim 1 wherein said step of retrieving said data indicating a default long distance carrier further comprises the step of retrieving a billing account number associated with said home network operator.

6. The method of claim 1 wherein said data indicating a default long distance carrier indicates a plurality of default long distance carriers, wherein said plurality of long distance carriers are prioritized within said data, and said step of selecting further comprises the step of selecting a highest priority long distance carrier that is available to service said roaming mobile station from said plurality of long distance carriers.

7. The method of claim 1 wherein said data indicating said default long distance carrier is retrieved from a memory register within said visited MSC.

8. A method of providing long distance service to a roaming mobile station using stored home network operator designated default long distance carrier information, said method comprising the steps of:
   determining that no data indicating a long distance carrier associated with said roaming mobile station has been received at a mobile switching center (MSC) serving said roaming mobile station;
   identifying by said MSC a home network operator associated with said roaming mobile station;
   selecting by said MSC from said stored home network operator designated default long distance carrier information a default long distance carrier designated by said identified home network operator; and
   providing long distance service to said roaming mobile station by utilizing said selected default long distance carrier.

9. The method of claim 8 wherein said step of determining that no data has been received includes the step of receiving no service code representing a particular long distance carrier from said roaming mobile station during outgoing call setup.

10. The method of claim 8 wherein said step of determining that no data has been received includes the step of receiving no data representing a long distance carrier from a home location register (HLR) associated with said roaming mobile station during initial registration.

11. The method of claim 8 wherein said step of identifying said home network operator further comprises the step of analyzing an identification number associated with said roaming mobile station.

12. The method of claim 11 wherein said identification number comprises an International Mobile Subscriber Identity (IMSI) number, said IMSI number comprises a Mobile Country Code (MCC) number, Mobile Network Code (MNC) number, and Mobile Subscriber Identification Number (MSIN) number, and wherein said step of analyzing said identification number further comprises the step of analyzing any part of said MCC and MNC numbers.

13. The method of claim 11 wherein said identification number comprises a Mobile Subscriber Integrated Service Digital Network (MSISDN) number associated with said roaming mobile station.

14. The method of claim 8 wherein said step of identifying said default long distance carrier designated by said identified home network operator further comprises the steps of:
   storing data representing said home network operator and said default long distance carrier at a register associated with said MSC; and
   retrieving said data representing said default long distance carrier from said memory register in response to an affirmative identification of said home network operator associated with said roaming mobile station.

15. The method of claim 8 wherein said step of identifying said long distance carrier further comprises the step of identifying a billing account number associated with said home network operator.

16. A system for selecting a long distance carrier for a roaming mobile station within a mobile telecommunications network from stored home network operator designated default long distance carrier information, said system comprising:
   means for determining at a visited mobile switching center (MSC) serving said mobile station an identification number associated with said roaming mobile station;
   means for identifying the home network operator associated with said identification number;
   means for selecting at said visited MSC from said stored home network operator designated default long distance carrier information a default long distance carrier designated by said identified home network operator; and
   means for providing long distance service to said roaming mobile station by said selected default long distance carrier.

17. The system of claim 16 wherein said means for determining said identification number associated with said roaming mobile station further comprises means for receiving said identification number from said roaming mobile station during initial registration.

18. The system of claim 16 wherein said identification number comprises an International Mobile Subscriber Identity (IMSI) number associated with said roaming mobile station.

19. The system of claim 18 wherein said means for identifying said home network operator further comprises means for analyzing part of said IMSI number to identify said home network operator.

20. The system of claim 16 wherein said means for storing further comprises a memory register associated with said visited MSC storing first data representing said default long distance carrier, said memory register further correlating said first data with second data representing said home network operator.

21. The system of claim 20 wherein said memory register further comprises third data representing a billing account number associated with said home network operator.

* * * * *